(12) United States Patent
Karelson et al.

(10) Patent No.: US 7,662,315 B2
(45) Date of Patent: Feb. 16, 2010

(54) COMPOSITE MATERIALS FOR INFRARED SENSING MARKERS

(75) Inventors: Mati Karelson, Tartu (EE); Neinar Seli, Tartu (EE)

(73) Assignee: Ou Raidenil, Tartu (EE)

( * ) Notice: Subject to any disclaimer, the term of this patent is extended or adjusted under 35 U.S.C. 154(b) by 0 days.

(21) Appl. No.: 12/224,663

(22) PCT Filed: Nov. 9, 2006

(86) PCT No.: PCT/EE2006/000009

§ 371 (c)(1),
(2), (4) Date: Oct. 30, 2008

(87) PCT Pub. No.: WO2007/098773

PCT Pub. Date: Sep. 7, 2007

(65) Prior Publication Data

US 2009/0065748 A1     Mar. 12, 2009

(30) Foreign Application Priority Data

Mar. 3, 2006    (EE) ................................ 200600004

(51) Int. Cl.
*H01B 1/06*     (2006.01)
*H01B 1/20*     (2006.01)

(52) U.S. Cl. .............................. 252/519.21; 252/501.1; 252/518.1; 252/519.2; 252/519.33; 252/519.34; 252/301.35

(58) Field of Classification Search ............ 252/519.21, 252/501.1, 518.1, 519.2, 519.33, 519.34, 252/301.35

See application file for complete search history.

(56) References Cited

U.S. PATENT DOCUMENTS

| | | | |
|---|---|---|---|
| 5,093,147 A | | 3/1992 | Andrus et al. |
| 5,292,855 A | * | 3/1994 | Krutak et al. ............... 528/289 |
| 5,336,714 A | * | 8/1994 | Krutak et al. ............... 524/608 |
| 2007/0156342 A1 | * | 7/2007 | Frimurer et al. ............. 702/19 |
| 2007/0259830 A1 | * | 11/2007 | Karelson et al. ............. 514/44 |

FOREIGN PATENT DOCUMENTS

| WO | WO-02/101847 A2 | 12/2002 |
|---|---|---|
| WO | WO-2004/011250 A1 | 2/2004 |

* cited by examiner

*Primary Examiner*—Douglas Mc Ginty
(74) *Attorney, Agent, or Firm*—Birch, Stewart, Kolasch & Birch, LLP

(57) ABSTRACT

The present invention discloses composite materials for distant laser sensing in the infrared spectral region. The composites are disclosed to consist of the conductive polymer, the infrared active compound and the thermoplastic matrix polymer.

22 Claims, 3 Drawing Sheets

COMPOSITE MATERIALS FOR INFRARED SENSING MARKERS

TECHNICAL FIELD

The invention is in the field of composite materials for the distant laser infrared sensing of marked objects.

BACKGROUND ART

An increasing number of disasters (natural and man-made) with a large number of victims and significant social and economical losses are observed in the last years. Although particular events can always be attributed to fate, it is improving the disaster management that have to contribute to decreasing damages and ensuring proper care for citizens in affected areas. In disaster crisis situation, it is of large importance to adequately determine the location of the possible victims and to identify them. This can be carried out on distance using the IR pulsed lasers at certain wavelengths, by registration of the fluorescence and reflection from special infomarkers. The present invention concerns the composite materials that are suitable for such infomarkers as having intense reflection/fluorescence at certain sharp wavelengths.

Near-infrared (700-900 nm) fluorescent compounds are well known in medical diagnostics [Riefke; B.; Semmler; W.; Speck; U.; Hilger; C.-S.; Near infrared imaging agent, U.S. Pat. No. 6,913,743, Jul. 5, 2005.; Changxia S., Jinghe Y., Lei L., Xia W., Yang L., Shufang L., Advances in the study of luminescence probes for proteins, Journal of Chromatography B, 803 (2004) 173-190.; Frangioni, J. V., In vivo near-infrared fluorescence imaging, Current Opinion in Chemical Biology 2003, 7:626-634.]

Also, materials have been proposed for providing intelligible markings that are virtually invisible to the unaided eye on the surface of an article [Acitelli; M. A. et al; Article identification material and method and apparatus for using it, U.S. Pat. No. 4,540,595, Sep. 10, 1985; Andrus; Paul G.; Dolash; T. M.; Providing intelligible markings, U.S. Pat. No. 5,093,147, Mar. 3, 1992; Kamoto; T.; Yamamoto; Y.; Sueyoshi; T.; Fluorescent marking composition and fluorescent mark formed by said composition, U.S. Pat. No. 5,880,176, Mar. 9, 1999.; Strand; M. A. et al: Pigment particles for invisible marking applications, U.S. Pat. No. 6,221,279, Apr. 24, 2001].

It has been shown that the infomarker material can store the information as in 3D memory. In the invention [Rentzepis; P. M. Three-dimensional optical memory, U.S. Pat. No. 5,268, 862, Dec. 7, 1993], an active medium, typically a photochromic material and more typically spirbenzopyran, maintained in a three-dimensional matrix, typically of polymer, has been illuminated in selected regions by two UV laser light beams, typically of 532 nm and 1064 nm wavelength, to change from a first, spiropyran, to a second, merocyanine, stable molecular isomeric form by process of two-photon absorption. Regions not temporally and spatially coincidentally illuminated were unchanged. Later illumination of the selected regions by two green-red laser light beams, typically of 1064 nm wavelength each, causes only the second, merocyanine, isomeric form to fluoresce. This fluorescence is detectable by photodetectors as stored binary data. Use of other medium permit the three-dimensional patterning of three-dimensional forms, such as polystyrene polymer solids patterned from liquid styrene monomer. Other examples of conformationally restricted compounds for information storage include aza-bodiby [Zhao, W.; Carreira, E. M.; Conformationally Restricted Aza-Bodipy: A Highly Fluorescent, Stable, Near-Infrared-Absorbing Dye, Angew. Chem. Int. Ed. 2005, 44, 1677-1679.]

A variety of other compounds can be applied as the infomarker infrared fluorescence carriers.

For instance, polymethine dyes (PDs) have been shown to be promising compounds for nonlinear optical applications, such as optical limiting, due to a strong and broad excited-state absorption (ESA) in the visible region. It is relatively easy to modify the PDs structure using different heterocyclic terminal groups, different lengths of the polymethine chain, and introduction of specific substitutes into the polymethine chain and cyclization of the chain by conjugated or unconjugated bridges [Kachkovski O D, Tolmachov O I, Slominskii Y L, Kudinova M O, Derevyanko N O, Zhukova O O, Electronic properties of polymethine systems 7: soliton symmetry breaking and spectral features of dyes with a long polymethine chain, DYES AND PIGMENTS 64 (3): 207-216 March 2005; Kachkovski A D, Zhukova O O, Electronic properties of polymethine systems. 6. Bond order and bond length changes upon excitation, DYES AND PIGMENTS 63 (3): 323-332 December 2004; Lepkowicz R S, Cirloganu C M, Przhonska O V, Hagan D J, Van Stryland E W, Bondar M V, Slominsky Y L, Kachkovski A D, Mayboroda E I, Absorption anisotropy studies of polymethine dyes, CHEMICAL PHYSICS 306 (1-3): 171-183 Nov. 15, 2004; Simon P, Landl M, Breza M, Kvasnik F, New NIR dyes for ammonia sensing, SENSORS AND ACTUATORS B-CHEMICAL 90 (1-3): 9-14 Sp. Iss. SI, Apr. 20, 2003].

Aromatic imides are known to be electrochromic with intense UV-vis absorptions in their neutral states. These imides exhibit bathochromic shifts to a longer wavelength toward the near infrared (NIR) region when they undergo one-electron reductions. Accordingly, the introduction of chiral centers into aromatic imides would allow for the detection and analysis of these chromophores using techniques dependent upon their optical activity, such as circular dichroism (CD) [Todd E K, Wang S, Wan X H, Wang Z Y, Chiral imides as potential chiroptical switches: synthesis and optical properties, TETRAHEDRON LETTERS 46 (4): 587-590 Jan. 24, 2005; Adams D J, Blake A J, Cooke P A, Gill C D, Simpkins N S, Highly enantioselective synthesis of chiral imides and derived products via chiral base desymmetrisation, TETRAHEDRON 58 (23): 4603-4615 Jun. 3, 2002].

Because the metal complexes of porphyrazines exhibit high fluorescence yield in the infrared (IR) region, their fluorescent changes in the photochromic process could be used as a sensitive binary optical readout [Luo Q F, Cheng S H, Tian H, Synthesis and phototropism of a new binuclear porphyrazinato magnesium(II), TETRAHEDRON LETTERS 45 (41): 7737-7740 Oct. 4 2004].

Rare earth metal complexes, especially Eu3+ complexes with organic ligands or a constituent in nanoparticles, characterise intensive florescence in infrared region. [Diamente, P. R.; van Veggel, F. C. J. M., Water-Soluble Ln3+-doped LnF3 Nanopartcles: Retention of Strong Luminescence and Potential as Biolabels, Journal of Fluorescence, Vol. 15, No. 4, 543-551 July 2005.; Lenaerts P, Ryckebosch E, Driesen K, Van Deun R, Nockemann P, Groller-Walrand C, Binnemans K, Study of the luminescence of tris (2 thenoyltrifluoroacetonato) lanthanide(III) complexes covalently linked to 1,10-phenanthroline-functionalized hybrid sol-gel glasses, JOURNAL OF LUMINESCENCE 114 (1): 77-84 July 2005.; Klink S I, Alink P O, Grave L, Peters F G A, Hofstraat J W, Geurts F. van Veggel FCJM, Fluorescent dyes as efficient photosensitizers for near-infrared Nd3+, JOURNAL OF CHEMICAL SOCIETY-PERKIN TRANSACTIONS 2 (3): 363-372 2001.; Bakker B H, Goes M, Hoebe N, van Ramesdonk H J, Verhoeven J W, Werts M H V, Hofstraat J W Luminescent materials and devices: lanthanide azatriphenylene complexes and electroluminescent charge transfer systems, COORDINATION CHEMISTRY REVIEWS 208: 3-16 Oct. 2000.; Wolbers M P O, vanVeggel F C J M, Hofstraat J W, Guerts F A J, Reinhoudt D N, Luminescence properties of m-terphenyl-based Eu3+ and Nd3+ complexes: visible and near-infrared emission JOURNAL OF THE CHEMICAL SOCIETY-PERKIN TRANSACTIONS 2 (11): 2275-2282 November 1997.] It is important to notice that the ions of lanthanides neodymium (Nd3+) and erbium (Er3+) adapt ideally as fluorescing ingredient, because they have inner 4 f gradations according to 1330 nm and 1550 nm. In general, the ions of lanthanides dissolve in organic solvents and in polymers relatively badly, then they ions beforehand encapsulate with organic ligands, to increase their contribution.

Some of the most promising materials for IR fluorescence are the electrically conductive conjugated organic polymers. For example, aryl amine polymers show, among their optical properties, photoluminescence in their reduced state, which is quenched when the polymer is oxidized. There are few studies concerning the photoluminescence of polyaniline (PANI) and similar materials [Akther H, Bhuiyan A H, Infrared and ultra violet-visible spectroscopic investigation of plasma polymerized N,N,3,5-tetramethylaniline thin films, THIN SOLID FILMS 474 (1-2): 14-18 Mar. 1, 2005; Antonel P S, Andrade E M, Molina F V, Potential and film thickness dependence of the photoluminescence of aryl amine polymers, ELECTROCHIMICA ACTA 49 (22-23): 3687-3692 Sep. 15, 2004]. Most of the polyamine polymers can be applied also as NIR sensing materials [Christie S, Scorsone E, Persaud K, Kvasnik F, Remote detection of gaseous ammonia using the near infrared transmission properties of Polyaniline, SENSORS AND ACTUATORS B-CHEMICAL 90 (1-3): 163-169 Sp. Iss. S I, Apr. 20, 2003; Scorsone E, Christie S, Persaud K C, Kvasnik F, Evanescent sensing of alkaline and acidic vapours using a plastic clad silica fibre doped with poly(o-methoxyaniline), SENSORS AND ACTUATORS B-CHEMICAL 97 (2-3): 174-181 Feb. 1, 2004].

DISCLOSURE OF INVENTION

The current invention consist of the conductive polymer, infrared active compounds, fluorescence active lanthanide organic complexes or lanthanide salt and the thermoplastic matrix polymer, fluoresce intensely after promotion by the laser in the infrared region of the spectrum at certain wavelength and certain intensity, capacitate to register it from distant.

The conductive polymers have remarkably intense IR absorbance and fluorescence due to the elongated π-electron systems. Within the embodiment of the present invention, such polymers include:

substituted and unsubstituted polyparaphenylenevinylenes with the Formula I

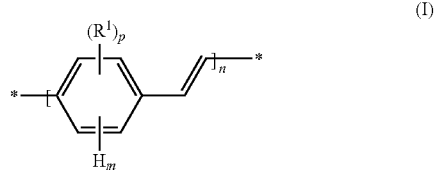

wherein n is at least about 4;

p is an integer from 0 to 4;

m is an integer from 0 to 4, with the proviso that p+m=4; and

R1 is independently selected so as to be the same or different at each occurrence and is selected from alkyl, alkenyl, alkoxy, cycloalkyl, cycloalkenyl, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two R1 groups together may form an alkylene or alkenylene chain completing a 3, 4, 5, 6, or 7-membered aromatic or alicyclic ring, which ring may optionally include one or more divalent nitrogen, sulfur or oxygen atoms, polyparaphenylene sulphides with the Formula II $$\ast\text{-}\!\!\left[\!\!\begin{array}{c}(R^1)_p\\ \phantom{x}\\ H_m\end{array}\!\!\right]\!\!\text{-}S\!\left.\right]_n\!\!\ast \qquad (II)$$

wherein n is at least about 4;

p is an integer from 0 to 4;

m is an integer from 0 to 4, with the proviso that p+m=4; and

R1 is independently selected so as to be the same or different at each occurrence and is selected from alkyl, alkenyl, alkoxy, cycloalkyl, cycloalkenyl, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two R1 groups together may form an alkylene or alkenylene chain completing a 3, 4, 5, 6, or 7-membered aromatic or alicyclic ring, which ring may optionally include one or more divalent nitrogen, sulfur or oxygen atoms, polyanilines with the Formula III and Formula IV

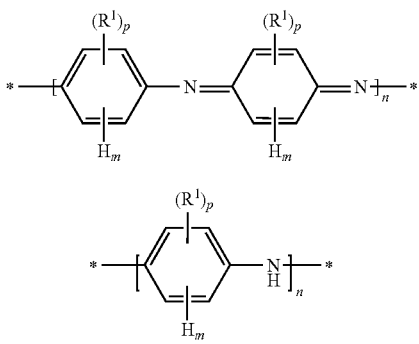

wherein
n is at least about 4;
p is an integer from 0 to 4;
m is an integer from 0 to 4, with the proviso that p+m=4; and
R1 is independently selected so as to be the same or different at each occurrence and is selected from alkyl, alkenyl, alkoxy, cycloalkyl, cycloalkenyl, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two R1 groups together may form an alkylene or alkenylene chain completing a 3, 4, 5, 6, or 7-membered aromatic or alicyclic ring, which ring may optionally include one or more divalent nitrogen, sulfur or oxygen atoms, polyazines with the Formula V

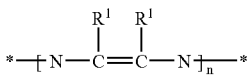

wherein
n is at least about 4; and
R1 is independently selected so as to be the same or different at each occurrence and is selected from alkyl, alkenyl, alkoxy, cycloalkyl, cycloalkenyl, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties polythiophenes with the Formula VI

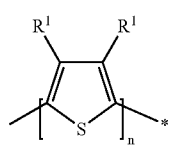

wherein
n is at least about 4;
R1 is independently selected so as to be the same or different at each occurrence and is selected from hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, ether sulfonate, and urethane; or both R1 groups together may form an alkylene or alkenylene chain completing a 3, 4, 5, 6, or 7-membered aromatic or alicyclic ring, which ring may optionally include one or more divalent nitrogen, sulfur or oxygen atoms, polyfuranes with the Formula VII

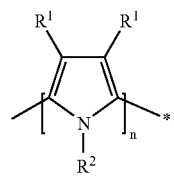

wherein
n is at least about 4
R1 is independently selected so as to be the same or different at each occurrence and is selected from hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, ether sulfonate, and urethane; or both R1 groups together may form an alkylene or alkenylene chain completing a 3, 4, 5, 6, or 7-membered aromatic or alicyclic ring, which ring may optionally include one or more divalent nitrogen, sulfur or oxygen atoms; and R2 is independently selected so as to be the same or different at each occurrence and is selected from hydrogen, alkyl, alkenyl, aryl, alkanoyl, alkylthioalkyl, alkylaryl, arylalkyl, amino, epoxy, silane, siloxane, alcohol, benzyl, carboxylate, ether, ether carboxylate, ether sulfonate, and urethane, polypyrroles with the Formula VIII

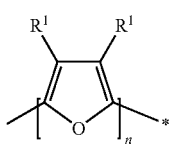

wherein
n is at least about 4;
R1 is independently selected so as to be the same or different at each occurrence and is selected from hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, ether sulfonate, and urethane; or both R1 groups together may form an alkylene or alkenylene chain completing a 3, 4, 5, 6, or 7-membered aromatic or alicyclic ring, which ring may optionally include one or more divalent nitrogen, sulfur or oxygen atoms, polyselenophenes with the Formula IX

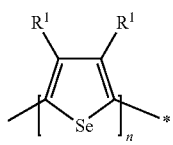

(IX)

wherein n is at least about 4;

R1 is independently selected so as to be the same or different at each occurrence and is selected from hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, ether sulfonate, and urethane; or both R1 groups together may form an alkylene or alkenylene chain completing a 3, 4, 5, 6, or 7-membered aromatic or alicyclic ring, which ring may optionally include one or more divalent nitrogen, sulfur or oxygen atoms, polyacetylenes with the Formula X

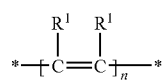

(X)

wherein n is at least about 4;

R1 is independently selected so as to be the same or different at each occurrence and is selected from alkyl, alkenyl, alkoxy, cycloalkyl, cycloalkenyl, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two R1 groups together may form an alkylene or alkenylene chain completing a 3, 4, 5, 6, or 7-membered aromatic or alicyclic ring, which ring may optionally include one or more divalent nitrogen, sulfur or oxygen atoms, polydithienopyridines with the Formula XI

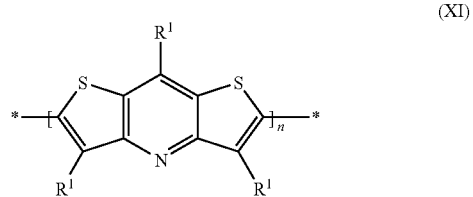

(XI)

wherein n is at least about 4;

R1 is independently selected so as to be the same or different at each occurrence and is selected from hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, ether sulfonate, and urethane, and polydithienothiophenes with the Formula XII

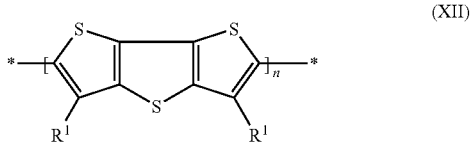

(XII)

wherein n is at least about 4;

R1 is independently selected so as to be the same or different at each occurrence and is selected from hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, ether sulfonate, and urethane.

BRIEF DESCRIPTION OF DRAWINGS

A preferred embodiment of the invention will now be described with reference to the accompanying drawing in which.

MODE(S) FOR CARRYING OUT THE INVENTION

Figure 1:
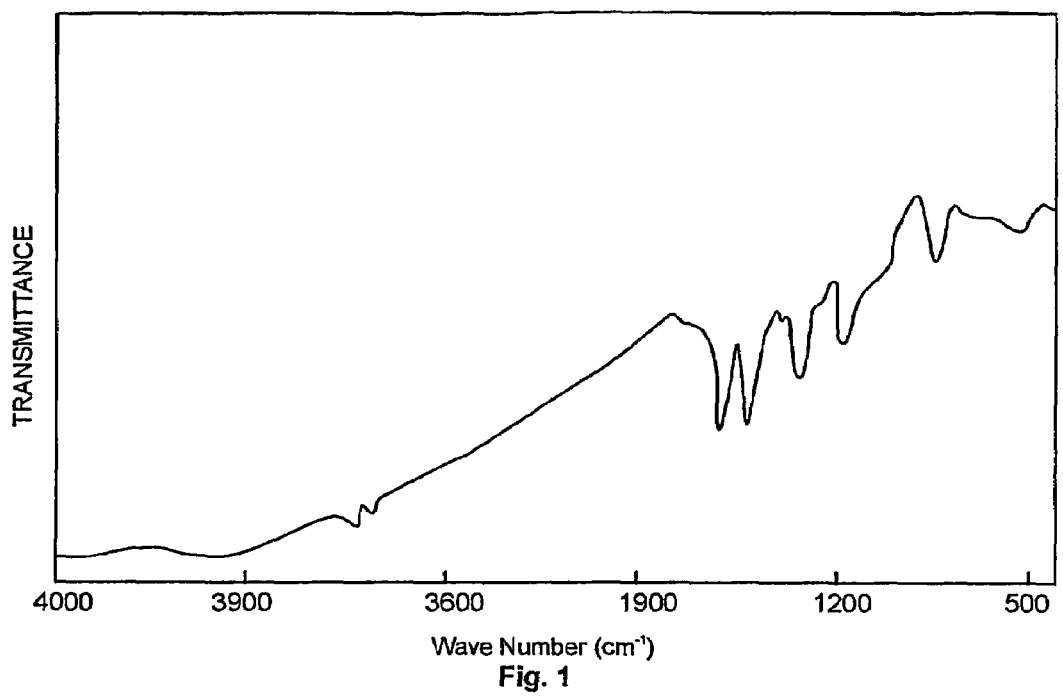
In FIG. 1, a typical IR absorbance spectrum of polyaniline (emeraldine) (IR absorbance spectrum of polyaniline-dodecylhydrogensulfate-sulfuric acid [Palaniappan, S.; Amarnath, C. A., Polyaniline-dodecylhydrogensulfate-acid salt: synthesis and characterization, Materials Chemistry and Physics, 92 (2005) 82-88.]) is given, FIG. 2, composite materials fluorescence spectrum (natural intensity scale) is given, FIG. 3, composite materials fluorescence spectrum (logarithmic intensity scale) is given, FIG. 4, composite materials fluorescence spectrum (natural intensity scale) with lanthanide salt additive.

FIG. 1 is describing a typical IR absorbance spectrum of polyaniline.

For the enhancement of the excitation and fluorescence, the infrared active additives, which have typical absorption in the range of wavelength 700-1250 nm, are used in the constitution of the composite material.

Such compounds include 1-butyl-2-[2-[3-[(1-butyl-6-chlorobenz[cd]indol-2(1H)-ylidene)ethylidene]-2-chloro-5-methyl-1-cyclohexen-1-yl]ethenyl]-6-chlorobenz[cd]indolium tetrafluoroborate (IR-1050) according to the Formula XIII

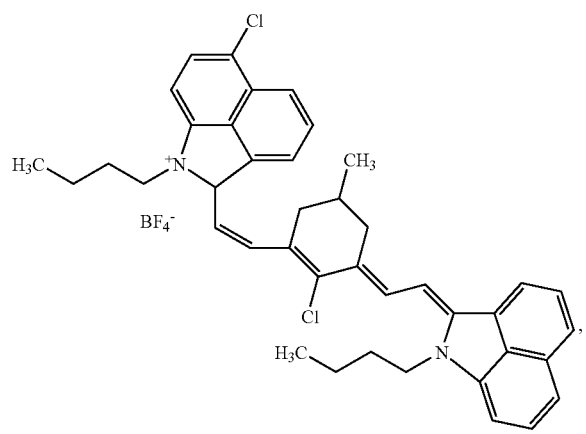

(XIII)

4-[2-[2-chloro-3-[(2,6-diphenyl-4H-thiopyran-4-ylidene)ethylidene]-1-cyclohexen-1-yl]ethenyl]-2,6-diphenylthiopyrylium tetrafluoroborate (IR-1061), 4-[2-[3-[(2,6-diphenyl-4H-thiopyran-4-ylidene)ethylidene]-2-phenyl-1-cyclohexen-1-yl]ethenyl]-2,6-diphenylthiopyrylium tetrafluoroborate (IR-1040), 1-butyl-2-[2-[3-[(1-butyl-6-chlorobenz[cd]indol-2(1H)-ylidene) ethylidene]-2-chloro-1-cyclohexen-1-yl]ethenyl]-6-chlorobenz[cd]indolium tetrafluoroborate (IR-1048) and the laser dye IR-1051 according to the Formula XIV

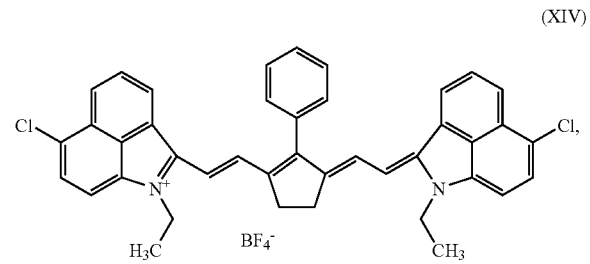

(XIV)

In the IR region higher wavelengths than 1000 nm appears lanthanide organic complexes and lanthanide glassy salts intensive fluorescence. In the current invention lanthanide compound is added to composite material. Varying with this composition and amount could code information, what is readable from distance with IR fluorescence register system.

In order to enhance the mechanical strength of the composite material and the resistance towards the external corrosive agents, plasticizer material is used. Thermoplastic polymers such as is polyethylene, polypropylene, polybutene-1, polystyrene, polyamide, polymethylmethacrylate, polyvinylchloride, polydimethyl siloxane, polyoxymethylene, polycarbonate, polyethylene terephthalate, polyetheretherketone, Nylon 6, polyamideimide, polysulphone, polyphenylene sulphide, polyethersulphone, polyetherimide, polytetrafluoroethylene are applied for this purpose.

The following examples together with the specific embodiments, which describe according to the invention, composite materials fluorescence spectrum illustrate the spectral quality of specific components and composite materials.

EXAMPLE 1

One example of the invention involves the composition of high-molecular weight polyaniline emeraldine base, MW≈300,000 (PANI1), infrared active compound 1-Butyl-2-[2-[3-[(1-butyl-6-chlorobenz[cd]indol-2(1H)-ylidene)ethylidene]-2-chloro-5-methyl-1-cyclohexen-1-yl]ethenyl]-chlorobenz[cd]indolium tetrafluoroborate (IR-1050), having an absorption $\lambda$max at 1050 nm, and the plasticizer polytetrafluoroethylene (PTFE). The relative content of individual components is as follows: PANI1-79.9%; IR-1050-5.1%; PTFE-15.0%. The fluorescence spectrum of the composite is given on FIG. 2 and FIG. 3 (Object 1). The maximum of the fluorescence is registered at $\lambda f=1377$ nm and the PL intensity is 19,800 a.u. The excitation is carried out with InGaAs laser (1064 nm, filter hc18, T=295K).

EXAMPLE 2

Another example of the invention involves the composition of low-molecular weight polyaniline emeraldine base, MW≈20,000 (PANI2), infrared active compound 1-Butyl-2-[2-[3-[(1-butyl-6-chlorobenz[cd]indol-2(1H)-ylidene) ethylidene]-2-chloro-5-methyl-1-cyclohexen-1-yl]ethenyl]-6-chlorobenz[cd]indolium tetrafluoroborate (IR-1050), and the plasticizer polytetrafluoroethylene (PTFE). The relative content of individual components is as follows: PANI2-79.9%; IR-1050-5.1%; PTFE-15.0%. The fluorescence spectrum of the composite is given on FIG. 2 and FIG. 3 (Object 2). The maximum of the fluorescence is registered at $\lambda f=1364$ nm and the PL intensity is 33,900 a.u. The excitation is carried out with InGaAs laser (1064 nm, filter hc18, T=295K).

EXAMPLE 3

Another example of the invention involves the composition of high-molecular weight polyaniline emeraldine base, MW≈300,000 (PANI1), infrared active compound 4-[2-[2-Chloro-3-[(2,6-diphenyl-4H-thiopyran-4-ylidene) ethylidene]-1-cyclohexen-1-yl]ethenyl]-2,6-diphenylthiopyrylium tetrafluoroborate (IR-1061), having an absorption $\lambda$max at 1061 nm, and the plasticizer polytetrafluoroethylene (PTFE). The relative content of individual components is as follows: PANI1-79.4%; IR-1050-5.6%; PTFE=15.0%. The fluorescence spectrum of the composite is given on FIG. 2 and FIG. 3 (Object 3). The maximum of the fluorescence is registered at $\lambda f=1404$ nm and the PL intensity is 7,100 a.u. The excitation is carried out with InGaAs laser (1064 nm, filter hc18, T=295K).

EXAMPLE 4

Another example of the invention involves the composition of low-molecular weight polyaniline emeraldine base, MW≈20,000 (PANI2), infrared active compound 4-[2-[2-Chloro-3-[(2,6-diphenyl-4H-thiopyran-4-ylidene) ethylidene]-1-cyclohexen-1-yl]ethenyl]-2,6-diphenylthiopyrylium tetrafluoroborate (IR-1061), and the plasticizer polytetrafluoroethylene (PTFE). The relative content of individual components is as follows: PANI2-79.9%; IR-1050-5.1%; PTFE-15.0%.

Figure 2:
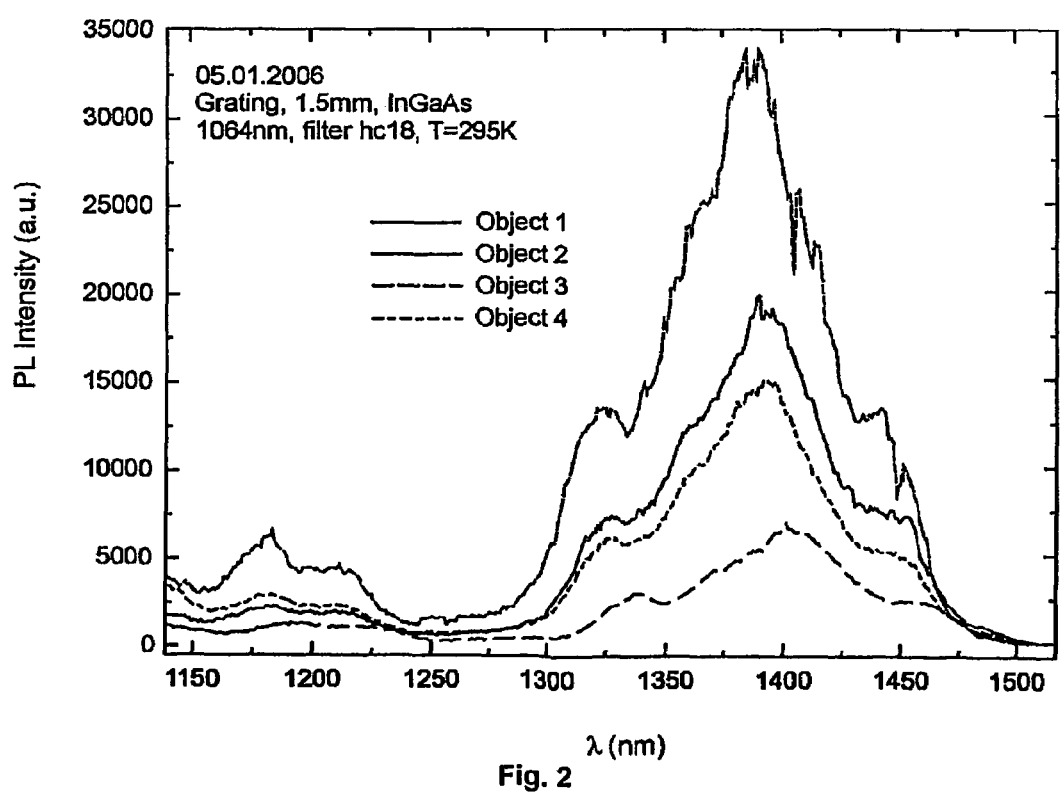
Figure 3:
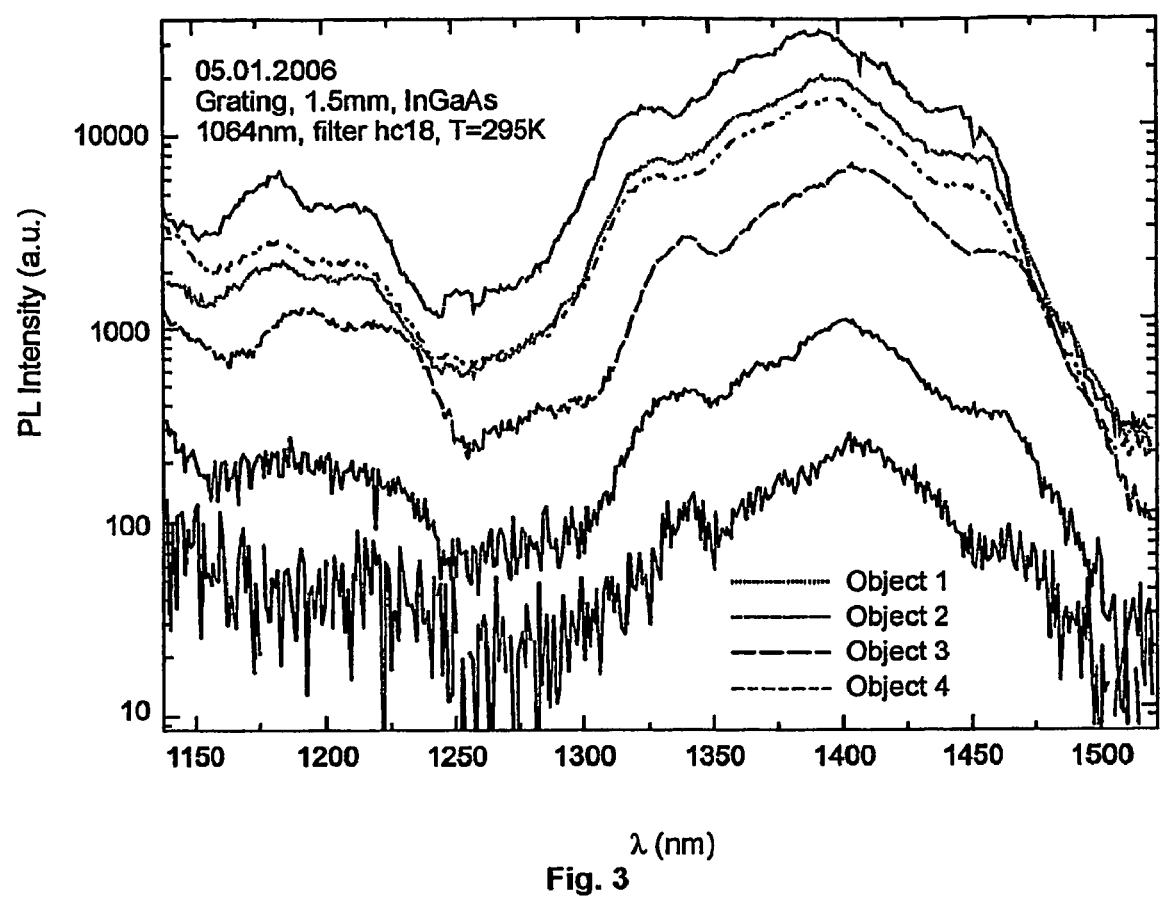

The fluorescence spectrum of the composite is given on FIG. 2 and FIG. 3 (Object 4). The maximum of the fluorescence is registered at f=1389 nm and the PL intensity is 14,400 a.u. The excitation is carried out with InGaAs laser (1064 nm, filter hc18, T=295K).

EXAMPLE 5

Figure 4:
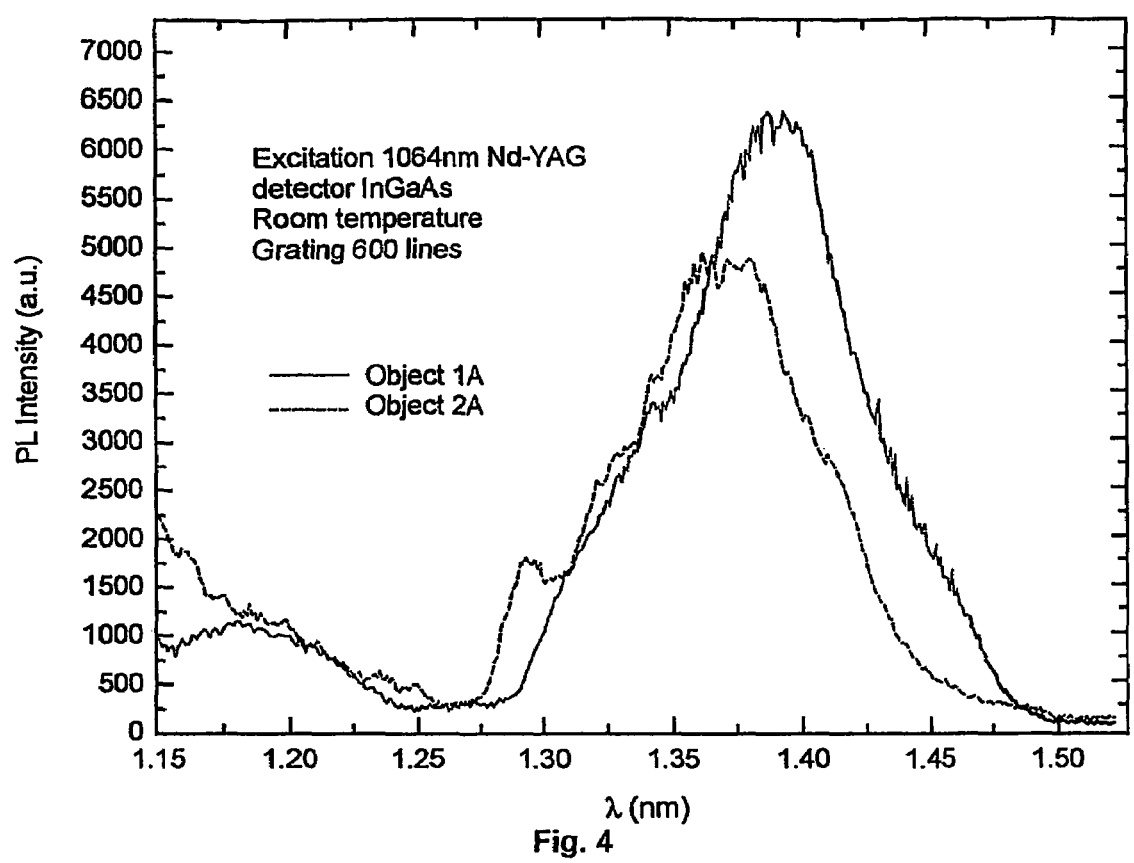

Another example of the invention involves the composition of high-molecular weight polyaniline emeraldine base, MW≈300,000 (PANI1), infrared active compound 1-Butyl-2-[2-[3-[(1-butyl-6-chlorobenz[cd]indol-2(1H)-ylidene)ethylidene]-2-chloro-5-methyl-1-cyclohexen-1-yl]ethenyl]-6-chlorobenz[cd]indolium tetrafluoroborate (IR-1050), absorption λmax at 1050 nm, Eu(NO3)3 and the plasticizer polytetrafluoroethylene (PTFE)), and the plasticizer polytetrafluoroethylene (PTFE). The relative content of individual components is as follows: PANI1-74.9%, Eu(NO3)3-5.0%, IR-1050-5.1%, PTFE-15.0%. The fluorescence spectrum of the composite is given on FIG. 4 (Object 1A). The maximum of the fluorescence is registered at λf=1403 nm and the PL intensity is 6,300 a.u. The excitation is carried out with InGaAs laser (1064 nm, filter hc18, T=295K).

EXAMPLE 6

Another example of the invention involves the composition of low-molecular weight polyaniline emeraldine base, MW≈20,000 (PANI2), infrared active compound 1-Butyl-2-[2-[3-[(1-butyl-6-chlorobenz[cd]indol-2(1H)-ylidene)ethylidene]-2-chloro-5-methyl-1-cyclohexen-1-yl]ethenyl]-6-chlorobenz[cd]indolium tetrafluoroborate (IR-1050), Eu(NO3)3 and the plasticizer polytetrafluoroethylene (PTFE). The relative content of individual components is as follows: PANI2-74.8%, IR-1050-5.1%, Eu(NO3)3-5.1%, PTFE-15.0%. The fluorescence spectrum of the composite is given on FIG. 4 (Object 2A). The maximum of the fluorescence is registered at f=1376 nm and the PL intensity is 4,800 a.u. The excitation is carried out with InGaAs laser (1064 nm, filter hc18, T=295K).

It is clear for the specialist of the given field, that current invention protection is not limited with the examples above, but according to the invention composite materials is possible to produce and obtain combining together protected characteristics added to patent claims and referred substances, so that the composite materials emit in the infrared region of the spectrum detectable intensive fluorescence emission.

REFERENCES

1. Acitelli; M. A. et al; Article identification material and method and apparatus for using it, U.S. Pat. No. 4,540,595, Sep. 10, 1985.
2. Andrus; Paul G.; Dolash; T. M.; Providing intelligible markings, U.S. Pat. No. 5,093,147, Mar. 3, 1992.
3. Jones; A. C. et al; Fluorescent materials, U.S. Pat. No. 6,682,810, Jan. 27, 2004.
4. Jones; A. C. et al; Fluorescent materials, US Patent Application No. 20050037231, Feb. 17, 2005.
5. Kamoto; T.; Yamamoto; Y.; Sueyoshi; T.; Fluorescent marking composition and fluorescent mark formed by said composition, U.S. Pat. No. 5,880,176, Mar. 9, 1999.
6. Rentzepis; P. M. Three-dimensional optical memory, U.S. Pat. No. 5,268,862, Dec. 7, 1993.
7. Riefke; B.; Semmler; W.; Speck; U.; Hilger; C.-S.; Near infrared imaging agent, U.S. Pat. No. 6,913,743, Jul. 5, 2005.
8. Strand; M. A. et al: Pigment particles for invisible marking applications, U.S. Pat. No. 6,221,279, Apr. 24, 2001.
9. Adams D J, Blake A J, Cooke P A, Gill C D, Simpkins N S, Highly enantioselective synthesis of chiral imides and derived products via chiral base desymmetrisation, TETRAHEDRON 58 (23): 4603-4615 Jun. 3, 2002.
10. Akther H, Bhuiyan A H, Infrared and ultra violet-visible spectroscopic investigation of plasma polymerized N,N,3,5-tetramethylaniline thin films, THIN SOLID FILMS 474 (1-2): 14-18 Mar. 1, 2005.
11. Antonel P S, Andrade E M, Molina F V, Potential and film thickness dependence of the photoluminescence of aryl amine polymers, ELECTROCHIMICA ACTA 49 (22-23): 3687-3692 Sep. 15, 2004.
12. Bakker B H, Goes M, Hoebe N, van Ramesdonk H J, Verhoeven J W, Werts M H V, Hofstraat J W Luminescent materials and devices: lanthanide azatriphenylene complexes and electroluminescent charge transfer systems, COORDINATION CHEMISTRY REVIEWS 208: 3-16 Oct. 2000
13. Changxia S., Jinghe Y., Lei L., Xia W., Yang L., Shufang L., Advances in the study of luminescence probes for proteins, Journal of Chromatography B, 803 (2004) 173-190.
14. Christie S, Scorsone E, Persaud K, Kvasnik E, Remote detection of gaseous ammonia using the near infrared transmission properties of Polyaniline, SENSORS AND ACTUATORS B-CHEMICAL 90 (1-3): 163-169 Sp. Iss. SI, Apr. 20, 2003.
15. Diamente, P. R.; van Veggel, F. C. J. M., Water-Soluble Ln3+-doped LnF3 Nanopartcles: Retention of Strong Luminescence and Potential as Biolabels, Journal of Fluorescence, Vol. 15, No. 4, 543-551 July 2005.
16. Frangioni, J. V., In vivo near-infrared fluorescence imaging, Current Opinion in Chemical Biology 2003, 7:626-634.
17. Kachkovski O D, Tolmachov I O, Slominskii Y L, Kudinova M O, Derevyanko N O, Zhukova O O, Electronic properties of polymethine systems 7: soliton symmetry breaking and spectral features of dyes with a long polymethine chain, DYES AND PIGMENTS 64 (3): 207-216 March 2005.
18. Kachkovski A D, Zhukova O O, Electronic properties of polymethine systems. 6. Bond order and bond length changes upon excitation, DYES AND PIGMENTS 63 (3): 323-332 December 2004.
19. Lenaerts P, Ryckebosch E, Driesen K, Van Deun R, Nockemann P, Groller-Walrand C, Binnemans K, Study of the luminescence of tris (2 thenoyltrifluoroacetonato) lanthanide(III) complexes covalently linked to 1,10-phenanthroline-functionalized hybrid sol-gel glasses, JOURNAL OF LUMINESCENCE 114 (1): 77-84 July 2005.
20. Lepkowicz R S, Cirloganu C M, Przhonska O V, Hagan D J, Van Stryland E W, Bondar M V, Slominsky Y L, Kachkovski A D, Mayboroda E I, Absorption anisotropy studies of polymethine dyes, CHEMICAL PHYSICS 306 (1-3): 171-183 Nov. 15, 2004.
21. Lepkowicz R S, Cirloganu C M, Przhonska O V, Hagan D J, Van Stryland E W, Bondar M V, Slominsky Y L, Kachkovski A D, Mayboroda E I, Absorption anisotropy studies of polymethine dyes, CHEMICAL PHYSICS 306 (1-3): 171-183 Nov. 15, 2004.
22. Luo Q F, Cheng S H, Tian H, Synthesis and phototropism of a new binuclear porphyrazinato magnesium(II), TETRAHEDRON LETTERS 45 (41): 7737-7740 Oct. 4, 2004.
23. Palaniappan, S.; Amarnath, C. A., Polyaniline-dodecylhydrogensulfate-acid salt: synthesis and characterization, Materials Chemistry and Physics, 92 (2005) 82-88.
24. Scorsone E, Christie S. Persaud K C, Kvasnik F, Evanescent sensing of alkaline and acidic vapours using a plastic clad silica fibre doped with poly(o-methoxyaniline), SENSORS AND ACTUATORS B-CHEMICAL 97 (2-3): 174-181 Feb. 1, 2004.
25. Simon P, Landl M, Breza M, Kvasnik F, New NIR dyes for ammonia sensing, SENSORS AND ACTUATORS B-CHEMICAL 90 (1-3): 9-14 Sp. Iss. S I, Apr. 20, 2003.
26. Todd E K, Wang S, Wan X H, Wang Z Y, Chiral imides as potential chiroptical switches: synthesis and optical properties, TETRAHEDRON LETTERS 46 (4): 587-590 Jan. 24, 2005.
27. Wolbers M P O, vanVeggel F C J M, Hofstraat J W, Guerts F A J, Reinhoudt D N, Luminescence properties of m-terphenyl-based Eu3+ and Nd3+ complexes: visible and near-infrared emission JOURNAL OF THE CHEMICAL SOCIETY-PERKIN TRANSACTIONS 2 (11): 2275-2282 November 1997.
28. Zhao, W., Carreira, E. M.; Conformationally Restricted Aza-Bodipy: A Highly Fluorescent, Stable, Near-Infrared-Absorbing Dye, Angew. Chem. Int. Ed. 2005, 44, 1677-1679.

The invention claimed is:

1. Composites that consist of 1) a conductive polymer, 2) an infrared active compound, lanthanoid organic complex or lanthanoid salt, and 3) a thermoplastic matrix polymer (plasticizer), wherein the aforesaid composite material emit in the infrared region of the spectrum detectable intensive fluorescence emission.

2. The composite according to claim 1, wherein said conductive polymer is selected from the group consisting of substituted and unsubstituted polyparaphenylenevinylenes, polyparaphenylene sulphides, polyanilines, polyazines, polythiophenes, polyfuranes, polypyrroles, polyselenophenes, polyacetylenes, polydithienopyridines, and polydithienothiophenes formed from soluble precursors and combinations thereof.

3. A composite according to claim 2, wherein said conductive polymer is a polyparaphenylenevinylene with the Formula I

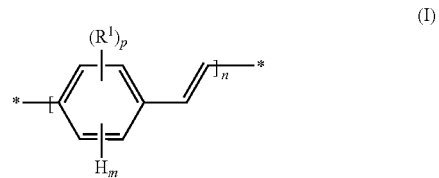

wherein
n is at least about 4;
p is an integer from 0 to 4;
m is an integer from 0 to 4, with the proviso that p+m=4; and
R1 is independently selected so as to be the same or different at each occurrence and is alkyl, alkenyl, alkoxy, cycloalkyl, cycloalkenyl, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two R1 groups together may form an alkylene or alkenylene chain completing a 3, 4, 5, 6, or 7-membered aromatic or alicyclic ring, which ring may optionally include one or more divalent nitrogen, sulfur or oxygen atoms.

4. A composite material according to claim 2, wherein said conductive polymer is a polyparaphenylene sulphide with the Formula II

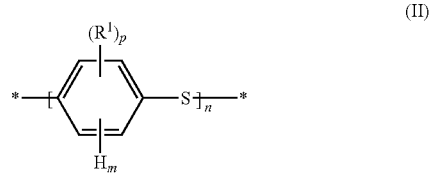

wherein
n is at least about 4;
p is an integer from 0 to 4;
m is an integer from 0 to 4, with the proviso that p+m=4; and
R1 is independently selected so as to be the same or different at each occurrence and is alkyl, alkenyl, alkoxy, cycloalkyl, cycloalkenyl, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two R1 groups together may form an alkylene or alkenylene chain completing a 3, 4, 5, 6, or 7-membered aromatic or alicyclic ring, which ring may optionally include one or more divalent nitrogen, sulfur or oxygen atoms.

5. A composite according to claim 2, wherein said conductive polymer is a polyaniline with the Formula III or Formula IV

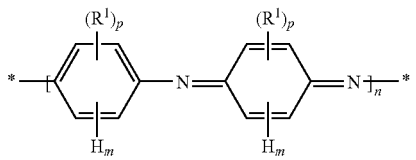

(III)

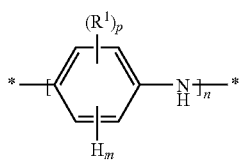

(IV)

wherein n is at least about 4;

p is an integer from 0 to 4;

m is an integer from 0 to 4, with the proviso that p+m=4; and

R1 is independently selected so as to be the same or different at each occurrence and is alkyl, alkenyl, alkoxy, cycloalkyl, cycloalkenyl, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two R1 groups together may form an alkylene or alkenylene chain completing a 3, 4, 5, 6, or 7-membered aromatic or alicyclic ring, which ring may optionally include one or more divalent nitrogen, sulfur or oxygen atoms.

6. A composite according to claim 2, wherein said conductive polymer is a polyazine with the Formula V

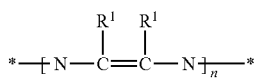

(V)

wherein n is at least about 4; and

R1 is independently selected so as to be the same or different at each occurrence and is alkyl, alkenyl, alkoxy, cycloalkyl, cycloalkenyl, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties.

7. A composite according to claim 2, wherein said conductive polymer is a polythiophene with the Formula VI

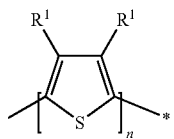

(VI)

wherein n is at least about 4;

R1 is independently selected so as to be the same or different at each occurrence and is hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, ether sulfonate, or urethane; or both R1 groups together may form an alkylene or alkenylene chain completing a 3, 4, 5, 6, or 7-membered aromatic or alicyclic ring, which ring may optionally include one or more divalent nitrogen, sulfur or oxygen atoms.

8. A composite according to claim 2, wherein said conductive polymer is a polypyrrole with the Formula VII

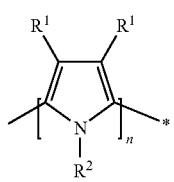

(VII)

wherein n is at least about 4

R1 is independently selected so as to be the same or different at each occurrence and is hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, ether sulfonate, or urethane; or both R1 groups together may form an alkylene or alkenylene chain completing a 3, 4, 5, 6, or 7-membered aromatic or alicyclic ring, which ring may optionally include one or more divalent nitrogen, sulfur or oxygen atoms; and R2 is independently selected so as to be the same or different at each occurrence and is hydrogen, alkyl, alkenyl, aryl, alkanoyl, alkylthioalkyl, alkylaryl, arylalkyl, amino, epoxy, silane, siloxane, alcohol, benzyl, carboxylate, ether, ether carboxylate, ether sulfonate, or urethane.

9. A composite according to claim 2, wherein said conductive polymer is a polyfuran with the Formula VIII

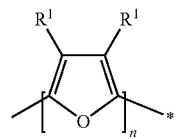

wherein n is at least about 4;

R1 is independently selected so as to be the same or different at each occurrence and is hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, ether sulfonate, or urethane; or both R1 groups together may form an alkylene or alkenylene chain completing a 3, 4, 5, 6, or 7-membered aromatic or alicyclic ring, which ring may optionally include one or more divalent nitrogen, sulfur or oxygen atoms.

10. A composite according to claim 2, wherein said conductive polymer is a polyselenophene with the Formula IX

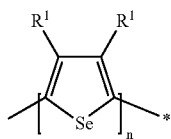

wherein n is at least about 4;

R1 is independently selected so as to be the same or different at each occurrence and is hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, ether sulfonate, or urethane; or both R1 groups together may form an alkylene or alkenylene chain completing a 3, 4, 5, 6, or 7-membered aromatic or alicyclic ring, which ring may optionally include one or more divalent nitrogen, sulfur or oxygen atoms.

11. A composite according to claim 2, wherein said conductive polymer is a polyacetylene with the Formula X

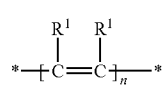

wherein n is at least about 4;

R1 is independently selected so as to be the same or different at each occurrence and is alkyl, alkenyl, alkoxy, cycloalkyl, cycloalkenyl, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two R1 groups together may form an alkylene or alkenylene chain completing a 3, 4, 5, 6, or 7-membered aromatic or alicyclic ring, which ring may optionally include one or more divalent nitrogen, sulfur or oxygen atoms.

12. A composite according to claim 2, wherein said conductive polymer is a polydithienopyridine with the Formula XI

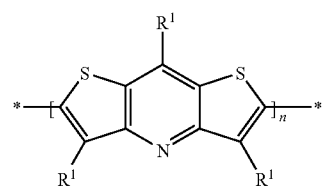

wherein n is at least about 4;

R1 is independently selected so as to be the same or different at each occurrence and is hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, ether sulfonate, or urethane.

13. A composite according to claim 2, wherein said conductive polymer is a polydithienothiophene with the Formula XII

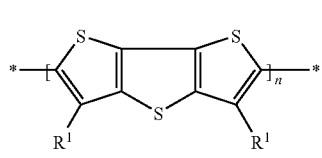

wherein n is at least about 4;

R1 is independently selected so as to be the same or different at each occurrence and is hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, ether sulfonate, or urethane.

14. The composite according to claim 1, wherein said infrared active compound has intensive emission spectrum in the range of 700-1250 nm and is 1-butyl-2-[2-[3-[(1-butyl-6-chlorobenz[cd]indol-2(1H)-ylidene) ethylidene]-2-chloro-5-methyl-1-cyclohexen-1-yl]ethenyl]-6-chlorobenz[cd]indolium tetrafluoroborate (IR-1050) with the Formula XIII

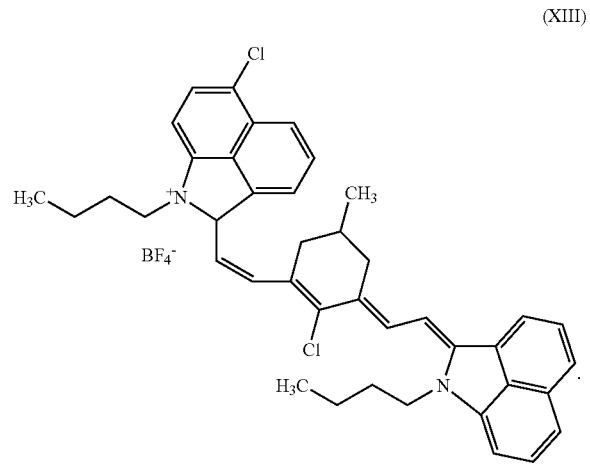

(XIII)

15. The composite according to claim 1, wherein said infrared active compound is 4-[2-[2-chloro-3-[(2,6-diphenyl-4H-thiopyran-4-ylidene) ethylidene]-1-cyclohexen-1-yl] ethenyl]-2,6-diphenylthiopyrylium tetrafluoroborate (IR-1061).

16. The composite according of claim 1, wherein said infrared active compound is 4-[2-[3-[(2,6-diphenyl-4H-thiopyran-4-ylidene) ethylidene]-2-phenyl-1-cyclohexen-1-yl] ethenyl]-2,6-diphenylthiopyrylium tetrafluoroborate (IR-1040).

17. The composite according to claim 1, wherein said infrared active compound is 1-butyl-2-[2-[3-[(1-butyl-6-chlorobenz[cd]indol-2(1H)-ylidene) ethylidene]-2-chloro-1-cyclohexen-1-yl]ethenyl]-6-chlorobenz[cd]indolium tetrafluoroborate (IR-1048).

18. The composite according to claim 1, wherein said infrared active compound is laser dye IR-1051 with the Formula XIV

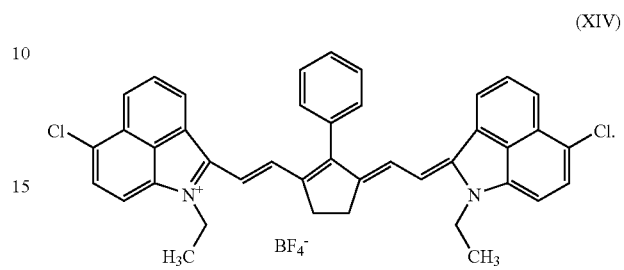

(XIV)

19. The composite according to claim 1, wherein said thermoplastic polymer is polyethylene, polypropylene, polybutene-1, polystyrene, polyamide, polymethylmethacrylate, polyvinylchloride, polydimethyl siloxane, polyoxymethylene, polycarbonate, polyethylene terephthalate, polyetheretherketone, Nylon 6, polyamideimide, polysulphone, polyphenylene sulphide, polyethersulphone, polyetherimide or polytetrafluoroethylene.

20. The composite according to claim 1, wherein said lanthanoid is Pr, Nd, Sm, Eu, Dy, Ho, Tb, Er, Tm or Yb.

21. The composite according to claim 1, wherein said organic complex is β-ketonate, mono-, di- or trialkyl-carboxylate, dansyl, coumarin, lissamine, Texas' red, asatrifenyleen, m-terfenyl, tris-8-quinoline, nikotinate or mono-dokosylftalate.

22. The composite according to claim 1, wherein said lanthanoid organic complex or lanthanoid salt is LnF3, LnCl3, LnBr3, Ln(NO3), Ln2(CO3)3, Ln-tosylate, Ln-carboxylate, Ln-dicarboxylate or Ln-tricarboxylate.

* * * * *